United States Patent
Solomon (10) Patent No.: US 9,118,602 B2
(45) Date of Patent: *Aug. 25, 2015

(54) TUNNEL PROVISIONING WITH LINK AGGREGATION

(71) Applicant: Orckit-Corrigent Ltd., Tel Aviv (IL)

(72) Inventor: Ronen Solomon, Ramat Gan (IL)

(73) Assignee: Orckit-Corrigent Ltd., Tel Aviv (IL)

( * ) Notice: Subject to any disclaimer, the term of this patent is extended or adjusted under 35 U.S.C. 154(b) by 102 days.

This patent is subject to a terminal disclaimer.

(21) Appl. No.: 13/969,520

(22) Filed: Aug. 17, 2013

(65) Prior Publication Data

US 2013/0336324 A1 Dec. 19, 2013

Related U.S. Application Data

(63) Continuation of application No. 13/116,696, filed on May 26, 2011, now Pat. No. 8,537,682, which is a continuation of application No. 11/123,801, filed on May 6, 2005, now Pat. No. 7,974,202.

(51) Int. Cl.
| | |
|---|---|
| *G08C 15/00* | (2006.01) |
| *H04L 12/28* | (2006.01) |
| *G06F 15/173* | (2006.01) |
| *H04L 12/723* | (2013.01) |
| *H04L 12/54* | (2013.01) |
| *H04L 12/715* | (2013.01) |
| *H04L 12/709* | (2013.01) |
| *H04L 12/913* | (2013.01) |
| *H04L 12/911* | (2013.01) |

(52) U.S. Cl.
CPC ............ *H04L 45/50* (2013.01); *H04L 12/5695* (2013.01); *H04L 45/04* (2013.01); *H04L 45/245* (2013.01); *H04L 45/502* (2013.01); *H04L 47/724* (2013.01); *H04L 47/728* (2013.01); *H04L 47/825* (2013.01); *H04L 47/829* (2013.01); *Y02B 60/33* (2013.01)

(58) Field of Classification Search
CPC ... H04L 12/5695; H04L 45/04; H04L 45/245; H04L 45/50; H04L 45/502; H04L 47/724; H04L 47/728; H04L 47/825; H04L 47/829
USPC ........... 370/235, 389, 392, 400; 709/239, 242
See application file for complete search history.

(56) References Cited

U.S. PATENT DOCUMENTS

| | | | |
|---|---|---|---|
| 7,983,286 B2 * | 7/2011 | Rekhter | 370/409 |
| 2003/0020976 A1 * | 1/2003 | Krishnaswamy et al. | 359/110 |
| 2004/0107285 A1 * | 6/2004 | Larson et al. | 709/229 |

(Continued)

OTHER PUBLICATIONS

Kireeti Kompella, "Internet Draft: Link Bundling in MPLS Traffic Engineering," Dec. 2004, Internet Engineering Task Force, <tools.ietf.org/id/d raft-ietf-mpls-bu ndle-06.txt>.*

Primary Examiner — Mounir Moutaouakil
(74) Attorney, Agent, or Firm — Peter A. Nieves; Sheehan Phinney Bass & Green PA (57) ABSTRACT

A method for processing data packets in a communication network includes establishing a path for a flow of the data packets through the communication network. At a node along the path having a plurality of aggregated ports, a port is selected from among the plurality to serve as part of the path. A label is chosen responsively to the selected port. The label is attached to the data packets in the flow at a point on the path upstream from the node. Upon receiving the data packets at the node, the data packets are switched through the selected port responsively to the label.

26 Claims, 3 Drawing Sheets

(56) References Cited

U.S. PATENT DOCUMENTS

| | | | |
|---|---|---|---|
| 2005/0083928 A1* | 4/2005 | Sivabalan et al. | 370/389 |
| 2005/0090275 A1* | 4/2005 | Wang | 455/512 |
| 2005/0125490 A1* | 6/2005 | Ramia | 709/202 |
| 2011/0206057 A1* | 8/2011 | Rekhter | 370/409 |

* cited by examiner

TUNNEL PROVISIONING WITH LINK AGGREGATION

CROSS-REFERENCE TO RELATED APPLICATIONS

This application is a continuation of, and claims priority to copending U.S. nonprovisional patent application entitled "Tunnel Provisioning With Link Aggregation," having Ser. No. 13/116,696, filed May 26, 2011, now U.S. Pat. No. 8,537, 682, which is a continuation of, and claims priority to U.S. nonprovisional patent application entitled "Tunnel Provisioning With Link Aggregation," having Ser. No. 11/123,801, filed May 6, 2005, now U.S. Pat. No. 7,974,202, each of which is hereby incorporated by reference in its entirety.

FIELD OF THE INVENTION

The present invention relates generally to communication networks, and particularly to methods and systems for performing link aggregation in tunneled networks.

BACKGROUND OF THE INVENTION

Multiprotocol Label Switching

Multiprotocol Label Switching (MPLS) has gained popularity as a method, for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference.

In MPLS, each packet is assigned to a Forwarding Equivalence Class (FEC) when it enters the network, depending on its destination address. The packet receives a fixed-length label, referred to as an "MPLS label" identifying the FEC to which it belongs. All packets in a given FEC are passed through the network over the same path by label-switching routers (LSRs). The flow of packets along a label-switched path (LSP) under MPLS is completely specified by the label applied at the ingress node of the path. Therefore, an LSP can be viewed as a tunnel through the network.

MPLS defines a label distribution protocol (LDP) by which one LSR informs another of the meaning of labels used to forward traffic between and through them. Another example is RSVP-TE, which is described by Awduche et al., in IETF RFC 3209 entitled "RSVP-TE: Extensions to RSVP for LSP Tunnels" (December 2001), which is incorporated herein by reference. RSVP-TE extends the well-known Resource Reservation Protocol (RSVP), allowing the establishment of explicitly-routed LSPs using RSVP as a signaling protocol. RSVP itself is described by Braden et al., in IETF RFC 2205, entitled "Resource ReSerVation Protocol (RSVP)—Version 1 Functional Specification" (September 1997), which is incorporated herein by reference.

Section 1 of RFC 2205 defines an "admission control" decision module, which is used during reservation setup to determine whether a node has sufficient available resources to supply the requested quality of service. The admission control module is used in RSVP-TE for setting up MPLS tunnels.

U.S. Patent Application Publication US 2002/0110087 A1, entitled "Efficient Setup of Label-Switched Connections," whose disclosure is incorporated herein by reference, describes methods and systems for carrying layer 2 services, such as Ethernet frames, through label-switched network tunnels.

Ethernet Link Aggregation

Link aggregation (LAG) is a technique by which a group of parallel physical links between two endpoints in a data network can be joined together into a single logical link (referred to as a "LAG group"). Traffic transmitted between the endpoints is distributed among the physical links in a manner that is transparent to the clients that send and receive the traffic. For Ethernet networks, link aggregation is defined by Clause 43 of IEEE Standard 802.3ad, Carrier Sense Multiple Access with Collision Detection (CSMA/CD) Access Method and Physical Layer Specifications (2002 Edition), which is incorporated herein by reference. Clause 43 defines a link aggregation protocol sub-layer, which interfaces between the standard Media Access Control (MAC) layer functions of the physical links in a link aggregation group and the MAC clients that transmit and receive traffic over the aggregated links.

U.S. Patent Application Publication US 2004/0228278 A1, entitled "Bandwidth Allocation for link Aggregation," the disclosure of which is incorporated herein by reference, describes methods for bandwidth allocation in a link aggregation system. The methods described in this publication are meant to ensure that sufficient bandwidth will be available on the links in the group in order to meet service guarantees, notwithstanding load fluctuations and link failures.

SUMMARY OF THE INVENTION

Embodiments of the present invention provide tunnel provisioning with link aggregation. Briefly described, a first aspect of the present invention is directed to a method for assigning and utilizing an Ethernet physical data port in an Ethernet Link Aggregation Group (LAG) in a Multi-Protocol Label Switching (MPLS) network. The method includes the steps of selecting, by a first MPLS/LAG switch, from a plurality of physical data ports in said first MPLS/LAG switch, a single physical tunnel port which meets a bandwidth requirement of a network tunnel, wherein said single physical tunnel port has a port serial number, assigning, by said first MPLS/LAG switch, said single physical tunnel port to said network tunnel, preparing, by said first MPLS/LAG switch, a data packet label by which said single physical tunnel port may be identified, receiving, by said first MPLS/LAG switch, a data packet including said data packet label at said first MPLS/LAG switch, and switching, by said first MPLS/LAG switch, said data packet to said single physical tunnel port according to said serial port number, and sending said data packet to a second MPLS/LAG switch via said single physical tunnel port.

A second aspect of the present invention includes a method for tagging a packet for transport through an Ethernet physical data port in an Ethernet Link Aggregation Group (LAG) located downstream from a preceding node in a Multi-Protocol Label Switching (MPLS) network tunnel employing Resource Reservation Protocol Traffic Engineering (RSVP-TE) tunnel provisioning. The method includes the steps of sending downstream to a MPLS/LAG switch, by the preceding node, an RSVP-TE PATH message, the RSVP-TE PATH message including a LABEL_REQUEST object requesting a network tunnel, and a bandwidth requirement, receiving, by the preceding node, a packet label sent by the MPLS/LAG switch, said packet label including a serial number of a single physical tunnel port in the MPLS/LAG switch, and wherein the single physical tunnel port meets the bandwidth requirement, attaching by the preceding node, said data packet label to a data packet sent by the preceding node, wherein the data packet is intended to be forwarded via the single physical tunnel port, and sending downstream to the MPLS/LAG switch, by the preceding node, a data packet including said data packet label.

A third aspect of the present invention includes an apparatus for assigning and utilizing an Ethernet physical data port in an Ethernet Link Aggregation Group (LAG) located downstream from a preceding node in a Multi-Protocol Label Switching (MPLS) network tunnel employing Resource Reservation Protocol Traffic Engineering (RSVP-TE) tunnel provisioning, the LAG having a first MPLS/LAG switch and a second MPLS/LAG switch. The apparatus includes a processor, which is configured to receive a tunnel configuration request message from the preceding node make a selection from a plurality of physical data ports in said first MPLS/LAG switch, of a single physical tunnel port which meets a bandwidth requirement of the network tunnel, wherein said single physical tunnel port has a port serial number, assign said single physical tunnel port to the network tunnel, prepare a data packet label, by which said single physical tunnel port may be identified, dedicate a sub-set of bits of said data packet label to encode said port serial number of said single physical tunnel port, and publish said packet label upstream.

The apparatus includes a mapper configured to receive a data packet from an upstream node, detect said data packet label in said data packet, and if said data packet contains said data packet label, to direct the first MPLS/LAG switch to switch said data packet to said single physical tunnel port, and send said data packet to the second MPLS/LAG switch via said single physical tunnel port.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

DETAILED DESCRIPTION OF EMBODIMENTS

Figure 1A:
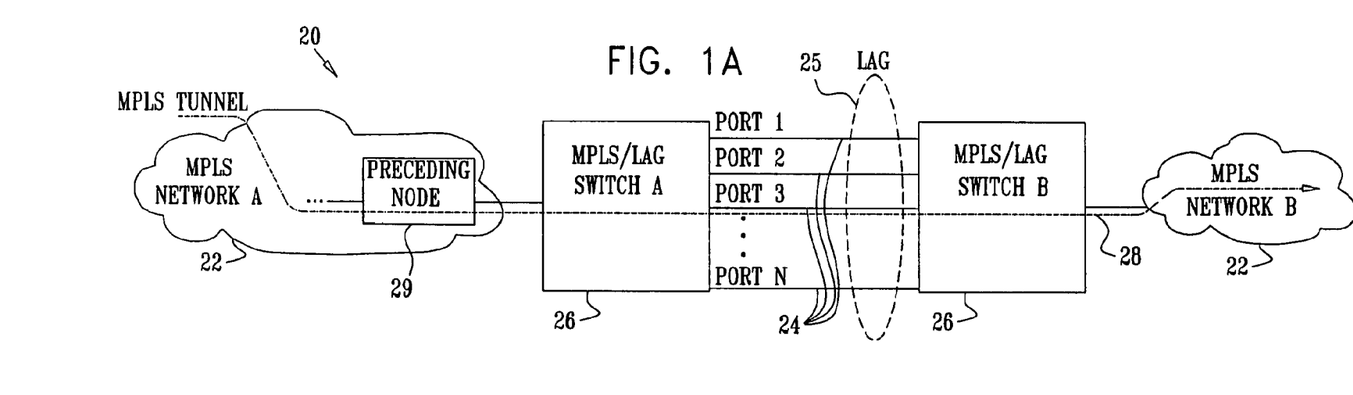
FIG. 1A is a block diagram that schematically illustrates an MPLS communication network, in accordance with an embodiment of the present invention.

FIG. 1A is a block diagram that schematically illustrates a computer communication network 20, in accordance with an embodiment of the present invention. System 20 includes two MPLS networks 22, labeled A and B, i.e., networks containing MPLS-capable switches. (Typically, these networks may also carry non-MPLS traffic, as in MPLS-capable IP networks that are known in the art.) MPLS networks A and B are connected via MPLS/LAG switches 26, using N physical Ethernet ports 24. Ports 24 are aggregated into a LAG group 25 using link aggregation (LAG) methods defined in the IEEE 802.3ad specification cited above. The two MPLS/LAG switches 26, which also function as LSRs, perform link aggregation and other packet routing/switching functions, according to methods which will be described below.

An MPLS tunnel 28 (a label switched path, or LSP, according to the MPLS specification cited above) is established from an ingress node in MPLS network A, through the two switches and the LAG group, to an egress node in MPLS network B. (The ingress and egress nodes are not shown in the figure.) The tunnel forms a path over which data frames traverse from the ingress node to the egress node. In the exemplary configuration of FIG. 1A, the MPLS tunnel is switched through one of ports 24, labeled "PORT 3." The term "downstream" typically denotes the direction of packet flow from the ingress node to the egress node along the tunnel. The term "upstream" denotes the opposite direction. The term "hop" denotes a part of the tunnel that connects two consecutive LSRs.

As part of the MPLS tunnel provisioning process (which is described in RFC 3031) each LSR along tunnel 28 attaches an MPLS label to the packets it transmits downstream to the next LSR, identifying the packets that belong to tunnel 28. Thus, in the example shown in FIG. 1A, MPLS/LAG switch A receives packets to which MPLS labels have been attached at a preceding node 29, which is an LSR located in MPLS network A, upstream from MPLS/LAG switch A. In most MPLS implementations, a given MPLS label is used within a single hop along the tunnel. In this case node 29 is the LSR that immediately precedes MPLS/LAG switch A in tunnel 28. In other MPLS implementations, the same label may be used for several adjacent hops of the tunnel, so that there may be one or more additional LSRs located between node 29 and switch A.

The exemplary network configuration shown in FIG. 1A was chosen for the sake of conceptual clarity. Other tunneled network configurations with link aggregation may use the methods and systems disclosed herein, as will be apparent to those skilled in the art. As noted earlier, these configurations may use MPLS and Ethernet LAG or other tunneling and link aggregation protocols known in the art.

Figure 1B:
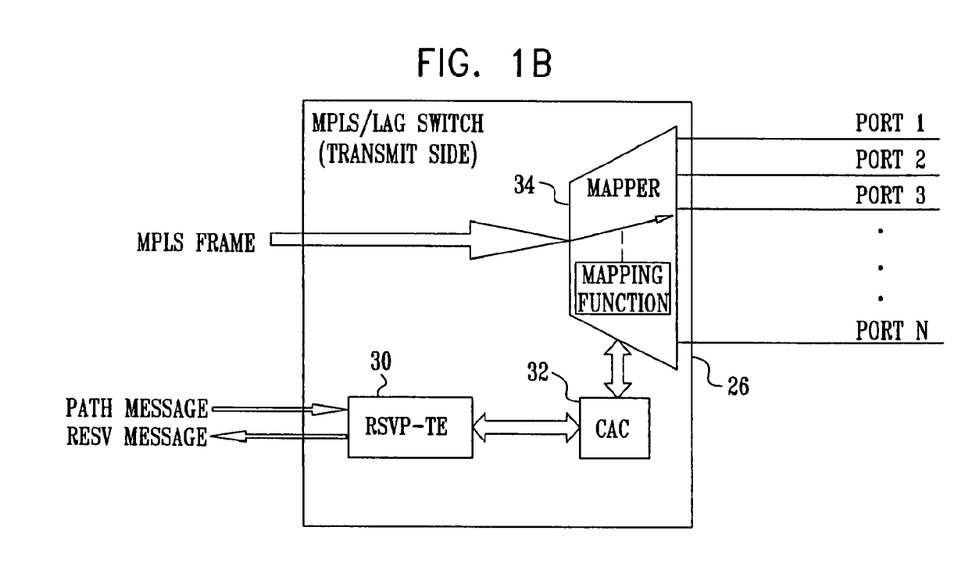
FIG. 1B is a block diagram that schematically illustrates an MPLS/LAG switch, in accordance with an embodiment of the present invention.

FIG. 1B is a block diagram that schematically shows details of MPLS/LAG switch 26, in accordance with an embodiment of the present invention. On the transmitting side of the LAG group, the switch typically receives an MPLS payload, encapsulated in Ethernet frames from the ingress node (either directly or via other LSRs in MPLS network A). Switch 26 switches the MPLS payload according to the MPLS label and re-encapsulates the MPLS payload into an Ethernet frame destined to the LAG group. Following the MPLS switching process, the MPLS switch performs the LAG function and maps the Ethernet frame to one of the physical Ethernet ports 24 of LAG group 25. On the receiving side of the LAG group, the switch collects the Ethernet frames from the ports of LAG group 25 and sends them to the egress node (either directly or via other LSRs, as defined by the tunnel).

Switch 26 has an RSVP-TE processor 30 and a CAC (Connection Admission Control) processor 32, which handle MPLS tunnel provisioning and the associated signaling. Although processors 30 and 32 are shown, for the sake of conceptual clarity, as separate functional units, in practice these two functions are typically implemented as software processes on the same processor. Practically speaking, they may generally be regarded as a single processor, regardless of implementation. Switch 26 also has a mapper 34, which maps each MPLS payload to a specific physical Ethernet port 24

(following the payload encapsulation into an Ethernet frame), according to methods which will be described below.

The methods described herein typically address a unidirectional packet flow, i.e., packets flowing from MPLS network A to MPLS network B. The methods are presented in this way because MPLS tunnels are unidirectional by definition. This fact does not limit the disclosed methods in any way to unidirectional message flows. Bidirectional packet flow is typically implemented by setting up two separate, independent MPLS tunnels.

MPLS/LAG switch 26 may be implemented using a network processor, which is programmed in software to carry out the functions described herein and is coupled to suitable hardware for interfacing with the MPLS network and Ethernet ports. Switch 26 may either include a standalone unit or may alternatively be integrated with other computing functions of the network processor. Some or all of the functions of switch 26 can also be implemented using a suitable general-purpose computer, a programmable logic device, an application-specific integrated circuit (ASIC) or a combination of such elements.

Figure 2:
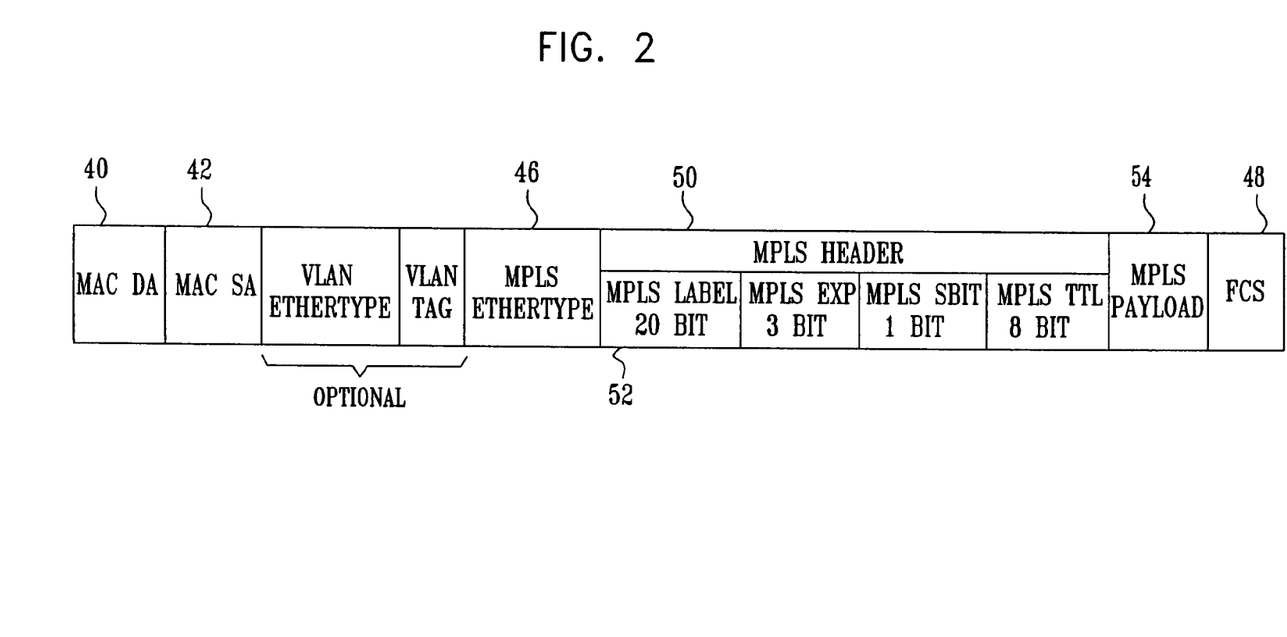
FIG. 2 is a block diagram that schematically illustrates an encapsulated MPLS packet, in accordance with an embodiment of the present invention.

FIG. 2 is a block diagram that schematically illustrates an MPLS packet encapsulated into an Ethernet II format, in accordance with an embodiment of the present invention. The Ethernet frame includes a MAC (Media Access Control) destination address field 40, a MAC source address field 42, and an Ethertype identifier field 46 used to identify the specific protocol. The frame ends with a frame check sequence (FCS) field 48 used for error detection. The encapsulated MPLS packet include an MPLS header 50, which has an MPLS label field 52. An MPLS payload field 54 includes the message body, containing information transmitted by the MPLS packet. In some implementations, the frame also includes optional VLAN Ethertype and VLAN tag fields.

Mapper 34 of switch 26 performs a mapping function that uses information carried in one or more fields of the encapsulated MPLS packet to select the physical Ethernet port for mapping the packet. The IEEE 802.3ad standard cited above does not dictate any particular mapping method for link aggregation, other than forbidding frame duplication and requiring that frame ordering be maintained over all frames in a given flow. In practice, to meet these requirements, the mapper typically maps all frames in a given MPLS tunnel to the same physical port.

The mapping function typically uses MPLS label 52 for mapping, since the MPLS label uniquely identifies MPLS tunnel 28, and it is required that all MPLS packets belonging to the same tunnel be switched through the same physical port 24. Additionally or alternatively, the mapping function uses a "PW" label (pseudo wire label, formerly known as a virtual connection, or VC label), which is optionally added to MPLS header 50. The PW label includes information that the egress node requires for delivering the packet to its destination, and is optionally added during the encapsulation of MPLS packets. Additional details regarding the VC label can be found in an IETF draft by Martini et al. entitled "Encapsulation Methods for Transport of Ethernet Frames Over IP/MPLS Networks" (IETF draft-ietf-pwe3-ethernet-encap-07.txt, May, 2004), which is incorporated herein by reference. In some embodiments, mapper 34 applies a hashing function to the MPLS and/or PW label, as will be described below.

Port Coding

Figure 3:
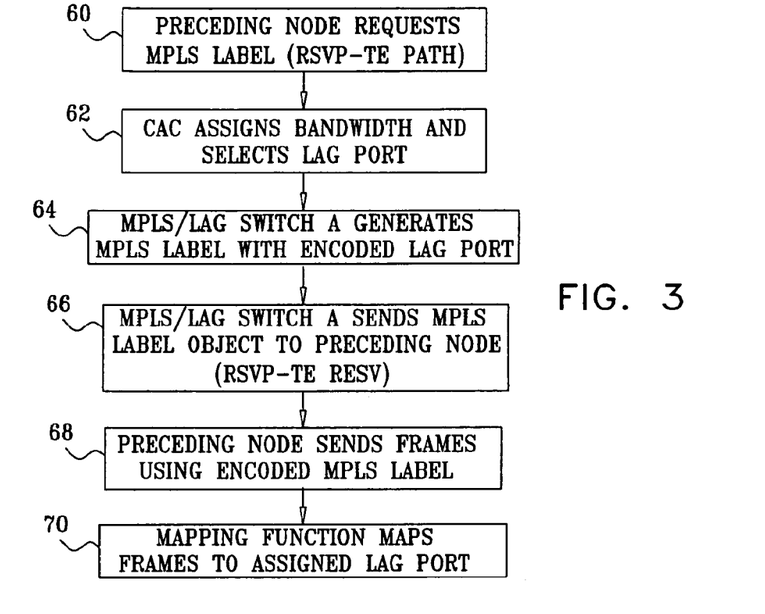
FIG. 3 is a flow chart that schematically illustrates a method for port allocation, in accordance with an embodiment of the present invention.

FIG. 3 is a flow chart that schematically illustrates a method for port allocation using port coding, in accordance with an embodiment of the present invention. This method, as well as the method of FIG. 4 described below, is used to provision MPLS tunnel 28 by allocating bandwidth on one of the physical ports of LAG group 25.

The method of FIG. 3 begins when the preceding node asks to establish a part of tunnel 28 (having one or more hops) for sending MPLS packets to MPLS/LAG switch 26 A. The preceding node requests and then receives the MPLS label, which it will subsequently attach to all packets that are sent to MPLS/LAG switch 26 labeled A. The preceding node sends downstream an RSVP-TE PATH message augmented with a LABEL_REQUEST object, as defined by RSVP-TE, to MPLS/LAG switch A, at a label requesting step 60. The PATH message typically includes information regarding service properties that are requested for tunnel 28. The service properties may include a guaranteed bandwidth (sometimes denoted CIR—Committed Information Rate) and a peak bandwidth (sometimes denoted PIR—Peak Information Rate), as well as a requested CoS (Class of Service—a measure of packet priority).

CAC processor 32 of switch A receives the PATH message and extracts the requested service properties. The CAC processor examines the available bandwidth of all ports 24 in LAG group 25 and selects a single physical port ("the selected physical port") on which to allocate bandwidth for MPLS tunnel 28, responsively to the requested service properties, at a port selection step 62. The selected physical port should be capable of providing sufficient peak and average bandwidths, as requested by the preceding node (and, originally, by the ingress node).

In one embodiment the CAC processor selects the physical port having a maximum available bandwidth out of the ports of LAG group 25. This approach attempts to distribute the packet flows evenly among the physical ports. In an alternative embodiment, the CAC processor may follow a "first-to-fill" strategy, i.e., select a physical port that will reach the highest utilization after allocating the requested bandwidth to tunnel 28. Any other suitable selection criteria may be applied by CAC processor 32. In the event that none of physical ports 24 has sufficient available bandwidth to comply with the requested service properties, the CAC processor returns an error message to the preceding node and denies the provisioning of tunnel 28. After successfully selecting the physical port, the CAC processor allocates and reserves the requested bandwidth for tunnel 28.

Regardless of the selection criterion used, the results of step 62 are that (1) a single physical port is explicitly selected and assigned to MPLS tunnel 28, and (2) sufficient bandwidth is allocated to tunnel 28, considering only the available bandwidth of the selected physical port, rather than the total available bandwidth of LAG group 25. All packets belonging to tunnel 28 will be switched through the same selected physical port, using the port coding technique described herein below.

Having selected a physical port, RSVP-TE processor 30 of switch A now generates a suitable MPLS label, at a label generation step 64. The preceding node upstream of switch A will subsequently attach this MPLS label to all MPLS packets transmitted through tunnel 28 to switch A. The label is assigned, in conjunction with the mapping function of mapper 34, so as to ensure that all MPLS packets carrying this label are switched through the physical port that was selected for this tunnel at step 62. For this purpose, RSVP-TE processor 30 of switch A dedicates a sub-set of the bits of MPLS label 52 to encode the serial number of the selected physical port. For example, the four least-significant bits of MPLS label 52 may be used for encoding the selected port number. This configuration is suitable for representing LAG groups having up to 16 physical ports (N<16). The remaining bits of MPLS label 52 may be chosen at random or using any suitable method known in the art.

RSVP-TE processor of switch 26 sends the generated MPLS label upstream to the preceding node, using an RSVP-TE RESV message augmented with a LABEL object, at a label sending step 66. At this stage, the part of tunnel 28 between the preceding node and switch A is provisioned and ready for use. The preceding node attaches the aforementioned MPLS label to all subsequent MPLS packets that it sends downstream through tunnel 28 to MPLS/LAG switch A, at a packet sending step 68.

Mapper 34 of switch A maps the received packets belonging to tunnel 28 to the selected physical Ethernet port at a mapping step 70. For this purpose, mapper 34 extracts the MPLS label from each received packet and decodes the selected physical port number from the dedicated sub-set of bits, such as the four LSB, as described in step 64 above. The decoded value is used for mapping the packet to the selected physical port, which was allocated by the CAC processor at step 62 above. In the four-bit example described above, the mapping function may be written explicitly as: Selected port number=((MPLS label) and (0x0000F)), wherein "and" denotes the "bitwise and" operator.

In an alternative embodiment, RSVP-TE processor 30 generates an arbitrary MPLS label at step 64 and stores this label together with the corresponding serial number of the selected physical port in a lookup table or other data structure. At step 70, the mapper extracts the MPLS label from each received MPLS packet and queries the lookup table with the MPLS label value to determine the physical port through which to switch the packet.

Inverse Hashing

Figure 4:
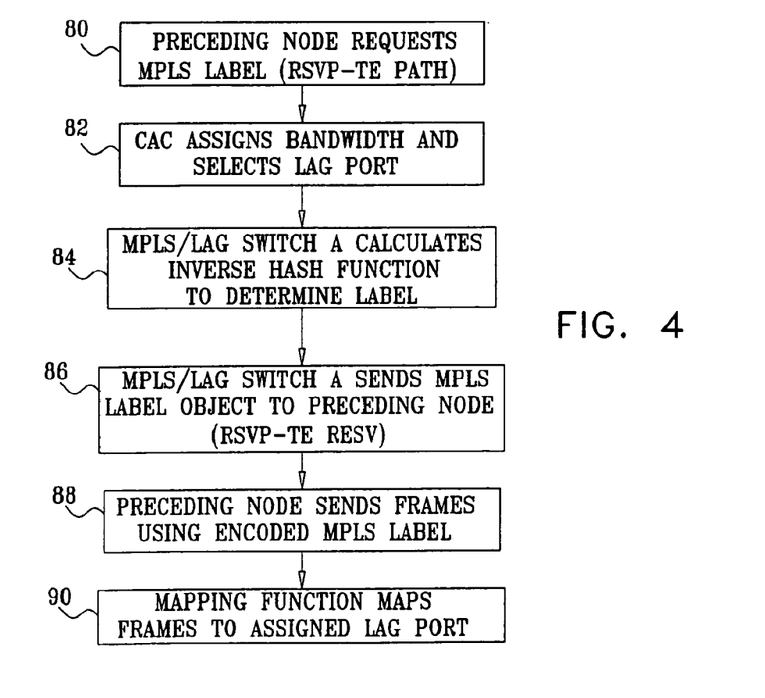
FIG. 4 is a flow chart that schematically illustrates a method for port allocation, in accordance with another embodiment of the present invention.

FIG. 4 is a flow chart that schematically illustrates an alternative method for port allocation, in accordance with another embodiment of the present invention. Similar to the method shown in FIG. 3 above, the method begins with the preceding node in MPLS network A asking to establish a part of MPLS tunnel 28 for sending MPLS packets to switch A. The preceding node sends downstream an RSVP-TE PATH message, at a label requesting step 80, which is identical to label requesting step 60 of FIG. 3 above. CAC processor 32 of switch A receives the PATH message, extracts the requested service properties, and selects a physical port out of group 25, at a port selection step 82. Step 82 is identical to port selection step 62 of FIG. 3 above.

In this method, the mapping function used by mapper 34 of switch A is a hashing function. Various hashing functions are known in the art, and any suitable hashing function may be used in mapper 34. Since the hashing operation is performed for each packet, it is desirable to have a hashing function that is computationally simple.

As mentioned above, the hashing function typically hashes the value of MPLS label 52 to determine the selected physical port, as the MPLS label uniquely identifies tunnel 28. For example, the following hashing function may be used by mapper 34: Selected port number=1+((MPLS label) mod N), wherein N denotes the number of physical Ethernet ports in LAG group 25, and "mod" denotes the modulus operator. Assuming the values of MPLS labels are distributed uniformly over a certain range, this function achieves a uniform distribution of port allocations for the different MPLS labels. It can also be seen that all packets carrying the same MPLS label (in other words—belonging to the same MPLS tunnel) will be mapped to the same physical port.

Returning to the description of FIG. 4, RSVP-TE processor 30 of switch A takes the serial number of the selected physical port (selected at step 82) and generates MPLS label 52 by calculating an inverse of the hashing function, at an inverse calculation step 84. The purpose of this step is to choose an MPLS label in a way that would cause the hashing function of mapper 34 to output the selected physical port (so that all subsequent packets carrying this label will be switched through this port). The following numerical example, which uses the hashing function given above, demonstrates the inverse hashing process:

The inverse of the hashing function given above is: MPLS label=(Selected port number−1)+N*MPLS.sub.p, wherein N denotes the number of physical ports in group 25, and MPLS.sub.p denotes a predetermined number, which is assigned by RSVP-TE processor 30 for each MPLS tunnel. Note that the value of MPLS.sub.p does not affect the hashing function, since different values of MPLS.sub.p only add integer multiples of N to the value of the MPLS label. The modulus operator of the hashing function eliminates this effect. This mechanism enables the same hashing/inverse-hashing functions to generate multiple MPLS labels to support multiple tunnels.

Assume that MPLS.sub.p=21882. Assume also that the LAG group has 3 ports (N=3) and that the CAC processor has selected physical port number 2 at step 82. The MPLS label calculated by the RSVP-TE processor at step 84 is thus given by: MPLS label=(2−1)+3*21882=65647

Having generated the MPLS label, RSVP-TE processor of switch A sends the MPLS label upstream to the preceding node, at a label sending step 86, which is identical to label sending step 66 of FIG. 3 above. At this stage, the part of tunnel 28 between the preceding node and switch A is provisioned and ready for use. The preceding node attaches the aforementioned MPLS label to all subsequent MPLS packets, belonging to tunnel 28, that are sent downstream to MPLS/LAG switch A, at a packet sending step 88.

Mapper 34 of switch A maps each received packet to the selected physical port of LAG group 25 using the hashing function, at a hashing step 90. Mapper 34 extracts the MPLS label from each received packet and uses the hashing function to calculate the serial number of the selected physical port, which was selected by the CAC processor at step 82. Following the numerical example given above, the mapper extracts MPLS label=65647 from the packet. Substituting this value and N=3 into the hashing function gives: Selected port number=1+(65647 mod 3)=2, which is indeed the port number selected in the example above.

Lag Protection

The IEEE 802.3ad standard cited above describes a protection mechanism for cases in which one of ports 24 fails or is intentionally taken out of service for any reason. In this case, the mapping function should distribute the data packets among the remaining ports. When using link aggregation in conjunction with tunneling methods such as MPLS, all packets belonging to a given tunnel should be switched through a single port 24. This property should be maintained in case of failure or port reconfiguration.

In an embodiment of the present invention, one of the N ports 24 of LAG group 25 is not used under normal network conditions and is maintained as a backup port. In the event that one of the active N−1 ports 24 fails or is taken out of service, switch A replaces the failed port with the backup port. As all ports 24 typically have equal bandwidths, the service properties required by tunnel 28 can be maintained.

In one embodiment, switch A may revert to the original port as soon as it recovers or returned into service. In an alternative embodiment, once the backup port has replaced a failed port, it continues to function as an ordinary port. The failed port, once recovered, begins to function as a backup port.

Although the methods and systems described hereinabove address mainly MPLS and Ethernet link aggregation, the principles of the present invention may also be used in conjunction with other communication protocols. For example, the methods described above may be adapted for use with other types of labeled traffic flows, such as flows labeled in accordance with other tunneling methods, and other link aggregation methods.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method for assigning and utilizing an Ethernet physical data port in an Ethernet Link Aggregation Group (LAG) in a Multi-Protocol Label Switching (MPLS) network, the method comprising the steps of:
assigning, by a first MPLS/LAG switch, a single physical tunnel port of a LAG to a network tunnel, wherein the single physical tunnel port of the LAG meets a bandwidth requirement of the network tunnel, and wherein said single physical tunnel port of the LAG has a port serial number;
dedicating a sub-set of bits in a data packet label prepared by the first MPLS/LAG switch to encode said port serial number of said single physical tunnel port of the LAG into the data packet label;
sending, by said first MPLS/LAG switch, the data packet label, in which said port serial number of said single physical tunnel port is encoded, to a preceding node;
receiving from the preceding node, by said first MPLS/LAG switch, a data packet comprising said data packet label, in which said port serial number of said single physical tunnel port is encoded; and
sending said data packet from said first MPLS/LAG switch to a second MSPLS/LAG switch via said single physical tunnel port having the port serial number encoded in the data packet label.

2. The method of claim 1, further comprising the step of receiving from a preceding node located upstream from said first MPLS/LAG switch, by said first MPLS/LAG switch, a request message requesting configuration of said network tunnel, the message further requesting said data packet label associated with said network tunnel.

3. The method of claim 2, wherein said request message comprises an RSVP-TE PATH message augmented with a LABEL_REQUEST object.

4. The method according to claim 3, wherein said request comprises an indication of a service property, and wherein said selecting comprises identifying a physical port in compliance with said service property.

5. The method according to claim 4, wherein said service property comprises at least one of: a guaranteed bandwidth; a peak bandwidth; and a class of service.

6. The method according to claim 1, wherein said selecting comprises selecting a single physical tunnel port having a maximum available bandwidth of said plurality of physical data ports.

7. The method according to claim 1, wherein said selecting comprises selecting a port having a minimum available bandwidth of said plurality of physical data ports which is not less than said bandwidth requirement of the network tunnel.

8. The method according to claim 1, wherein said switching said data packet is according to a mapping function.

9. The method according to claim 1, wherein said preparing comprises inserting into said data packet label a set of bits that identify said single physical tunnel port; and wherein said switching said data packet comprises extracting said set of bits to determine an identity of said single physical tunnel port.

10. The method according to claim 1, wherein said preparing comprises storing said data packet label along with an identifier of said single physical tunnel port in a memory, and wherein said switching said data packet comprises retrieving said identifier from said memory responsively to said data packet label.

11. The method according to claim 1, further comprising the steps of: selecting a backup port from among the plurality of physical data ports, different from said single physical tunnel port; and responsively to a service interruption of said single physical tunnel port, switching said data packet to said backup port and sending said data packet to said second MPLS/LAG switch via said backup port.

12. The method according to claim 11, further comprising the step of responsive to a restoral of said service interruption of said single physical tunnel port, reverting switching of said data packet from said backup port and sending said data packet to said second MPLS/LAG switch via said single physical tunnel port.

13. The method according to claim 1, wherein said first MPLS/LAG switch comprises a Label Switched Router (LSR).

14. The method of claim 1, further comprising the step of designating by said first MPLS/LAG switch, the plurality of physical data ports in said first MPLS/LAG switch as a single logical port.

15. An apparatus for assigning and utilizing an Ethernet physical data port in an Ethernet Link Aggregation Group (LAG) located downstream from a preceding node in a Multi-Protocol Label Switching (MPLS) network tunnel employing Resource Reservation Protocol Traffic Engineering (RSVP-TE) tunnel provisioning, the LAG having a first MPLS/LAG switch and a second MPLS/LAG switch, the apparatus comprising:
a processor, which is configured to:
assign a single physical tunnel port of a LAG to a network tunnel, wherein said single physical tunnel port meets a bandwidth requirement of the network tunnel, and wherein said single physical tunnel port has a port serial number;
dedicate a sub-set of bits in a data packet label to encode said port serial number of said single physical tunnel port of the LAG into the data packet label;
publish said packet label upstream; and
a mapper, which is configured to:
receive a data packet from an upstream node;
detect said data packet label in said data packet; and
if said data packet contains said data packet label, send said data packet to the second MPLS/LAG switch via said single physical tunnel port.

16. The apparatus according to claim 15, wherein the processor is configured to make said selection in compliance with a service property.

17. The apparatus according to claim 16, wherein said service property comprises at least one of the group consisting of a guaranteed bandwidth, a peak bandwidth, and a class of service.

18. The apparatus according to claim 17, wherein said processor is configured to make said selection of a port having a maximum available bandwidth of the plurality of ports.

19. The apparatus according to claim 17, wherein said processor is configured to make said selection of a port having a minimum available bandwidth of the plurality of ports which is not less than said bandwidth requirement of the network tunnel.

20. The apparatus according to claim 15, wherein said processor is configured to insert into said data packet label a set of bits which identify said single physical tunnel port; and wherein said mapper is configured to extract said set of bits to determine an identity of said single physical tunnel port.

21. The apparatus according to claim 15, further comprising a memory, and wherein said processor is configured to store said data packet label along with an identifier of said single physical tunnel port in said memory, and wherein said mapper is configured to retrieve said identifier from said memory responsively to said data packet label.

22. The apparatus according to claim 15, wherein said processor is further configured to select a backup port from among the plurality of physical data ports, different from said single physical tunnel port, and wherein said mapper is further configured, responsively to a service interruption of said single physical tunnel port, to direct the first MPLS/LAG switch to switch said data packet to said backup port, and send said data packet to the second MPLS/LAG switch via said backup port.

23. The apparatus according to claim 15, wherein said first MPLS/LAG switch comprises a Label Switched Router (LSR).

24. The apparatus according to claim 15, wherein said processor comprises a network processor.

25. The apparatus according to claim 15, wherein said plurality of physical data ports are selected from a single logical port.

26. A method for assigning and utilizing an Ethernet physical data port in an Ethernet Link Aggregation Group (LAG) in a Multi-Protocol Label Switching (MPLS) network, the method comprising the steps of:

receiving from a preceding node located upstream from a first MPLS/LAG switch, at said first MPLS/LAG switch, a request message requesting configuration of a network tunnel, the message further requesting a data packet label associated with said network tunnel, said request message specifying a bandwidth requirement;

assigning, at the first MPLS/LAG switch, a single physical tunnel port of a LAG to the network tunnel wherein the single physical tunnel port of the LAG, which meets the specified bandwidth requirement, wherein said single physical tunnel port of said LAG has a port serial number;

dedicating a sub-set of bits in a data packet label prepared by said first MPLS/LAG switch to encode said port serial number of said single physical tunnel port of the LAG into the data packet label;

sending, by said first MPLS/LAG switch, said data packet label, in which said port serial number of said single physical tunnel port is encoded, to the preceding node;

receiving from the preceding node, at said first MPLS/LAG switch, a data packet that includes said data packet label, in which said port serial number of said single physical tunnel port is encoded; and sending said data packet from said first MPLS/LAG switch to a second MSPLS/LAG switch via said single physical tunnel port having the port serial number encoded in the data packet label.

* * * * *